March 6, 1951 H. F. SCHAEFER, JR 2,543,872
COMPUTER FOR AVIATION TRAINERS AND THE LIKE
Filed Dec. 30, 1947 4 Sheets-Sheet 2

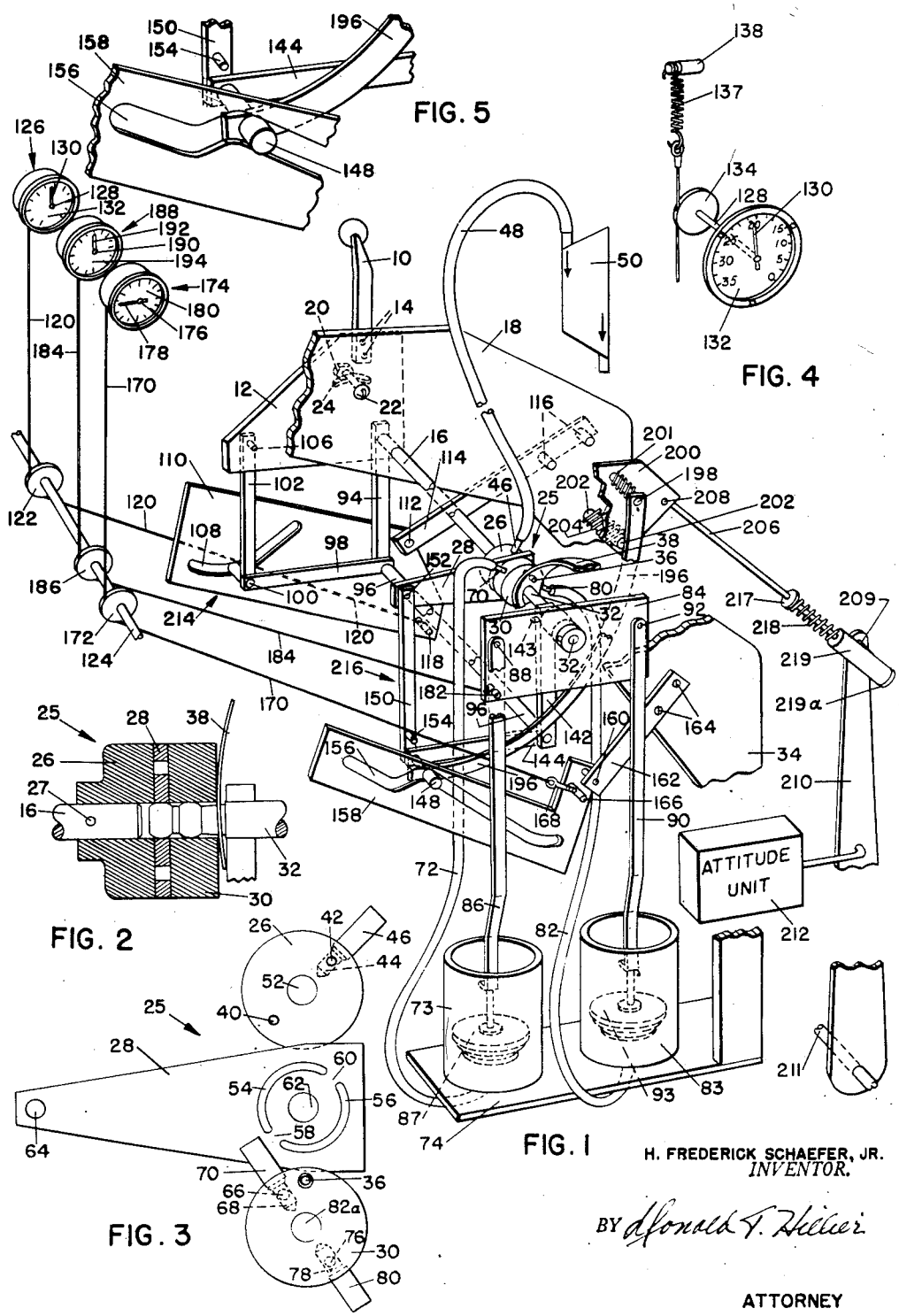

H. FREDERICK SCHAEFER, JR.
*INVENTOR.*

BY

ATTORNEY

March 6, 1951     H. F. SCHAEFER, JR     2,543,872
COMPUTER FOR AVIATION TRAINERS AND THE LIKE
Filed Dec. 30, 1947     4 Sheets-Sheet 4
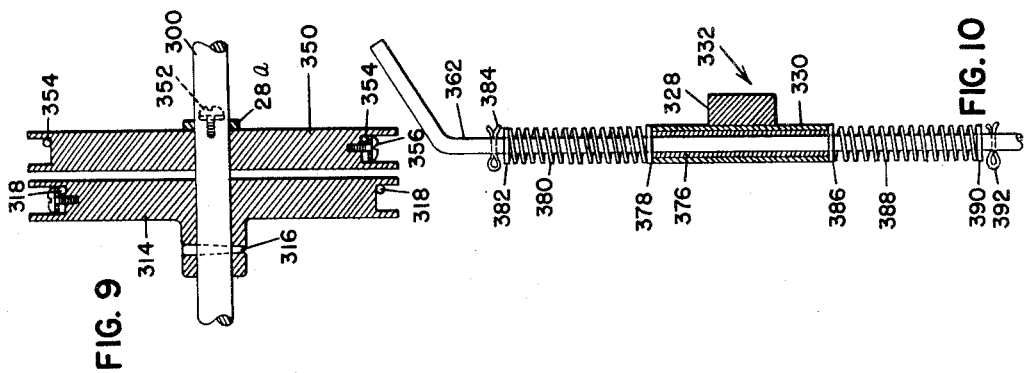
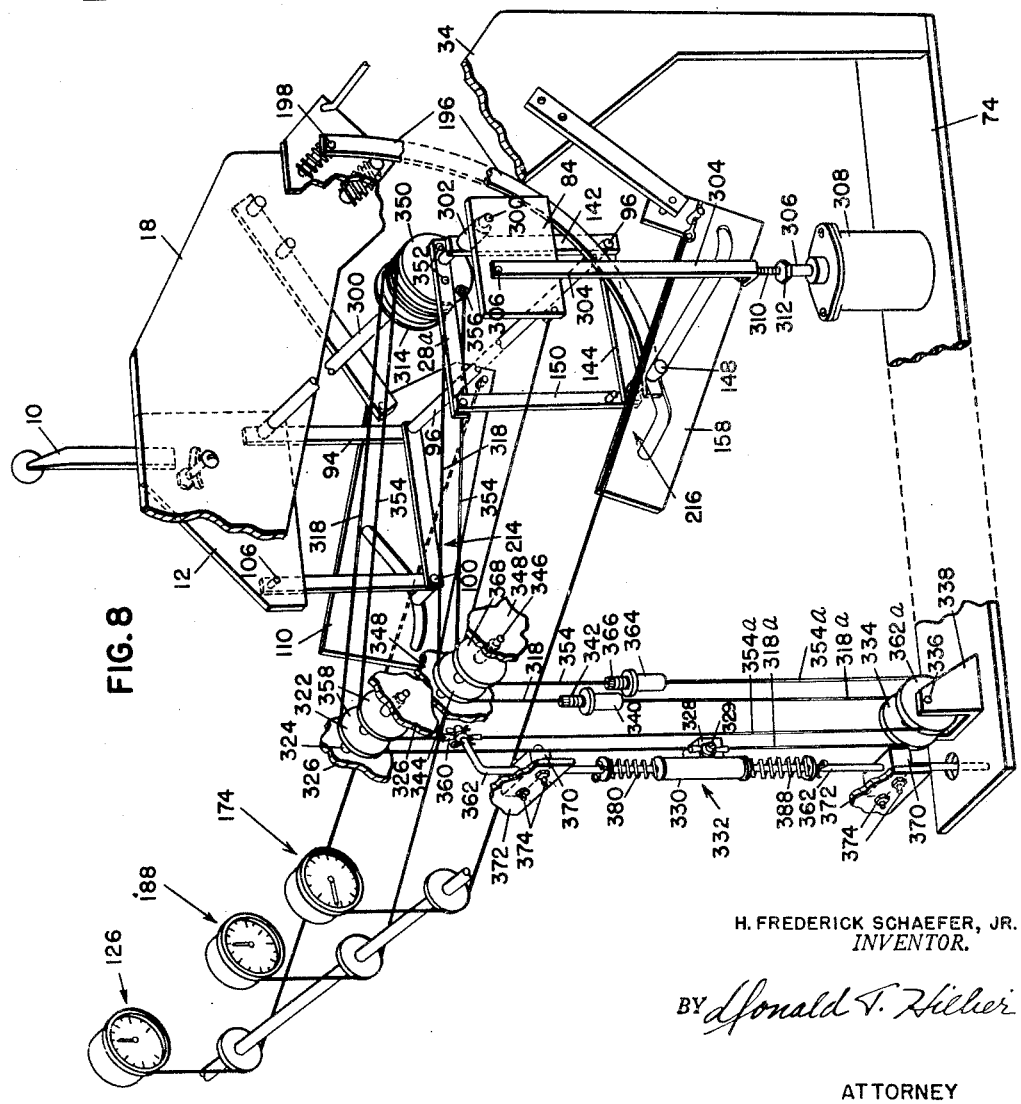
H. FREDERICK SCHAEFER, JR.
*INVENTOR.*
BY Donald T. Hillier
ATTORNEY Patented Mar. 6, 1951

2,543,872

UNITED STATES PATENT OFFICE 2,543,872

COMPUTER FOR AVIATION TRAINERS AND THE LIKE

Hans Frederick Schaefer, Jr., Marblehead, Mass., assignor to Link Aviation, Inc., Binghamton, N. Y., a corporation of New York Application December 30, 1947, Serial No. 794,575

12 Claims. (Cl. 235—61)

This invention relates to computers for use in grounded aviation trainers and the like, and more particularly relates to a computer for computing the instant assumed air speed, instant assumed vertical speed and instant assumed engine speed in response to the combined input factors of brake horsepower available and pitch attitude.

The present invention is an improvement upon the invention disclosed in my previously filed co-pending application Serial Number 737,696 filed June 2, 1947, for Computer for Aviation Trainer and the like.

The present invention differs from the invention disclosed in my previously filed application in that the present invention employs a pair of substantially similar computers both operative in response to changes in the same input factors of assumed brake horsepower available and assumed trainer attitude, and both of which computers are operated to position the master pivot thereof in accordance with the output factors of assumed air speed, assumed vertical speed and assumed engine speed. However, the master pivot of one of the computers operates the take-off apparatus which is connected to the simulated tachometer to give an assumed engine speed indication, while the master pivot of the other computer operates the take-off mechanism connected to the simulated air speed indicator and simulated vertical speed indicator to give the simulated air speed and vertical speed indications. The computers are arranged to operate out of phase with one another, in order that the simulated tachometer, simulated air speed indicator and simulated vertical speed indicator will at all times indicate correct assumed values.

The apparatus of the invention is further designed to simulate the performance of a typical small pleasure type of airplane equipped with a fixed pitch propeller.

In order that the preferred embodiment of my invention may be clearly understood, reference is made to the accompanying drawings wherein, Fig. 1 is a perspective view of the essential parts of the apparatus of one embodiment of my invention.

Fig. 2 is a cross-sectional view of the valve disclosed in Fig. 1.

Fig. 3 is an exploded view of the same valve.

Fig. 4 is a detailed view of the simulated tachometer.

Fig. 5 is a detailed perspective view of the master pivot and associated parts of one of the computers of this invention.

Fig. 8 is a general perspective view of the apparatus of this invention disclosing a second embodiment of the follow-up means, and Figs. 9 and 10 are cross sectional views of parts of the apparatus shown in Fig. 8.

Figure 6:
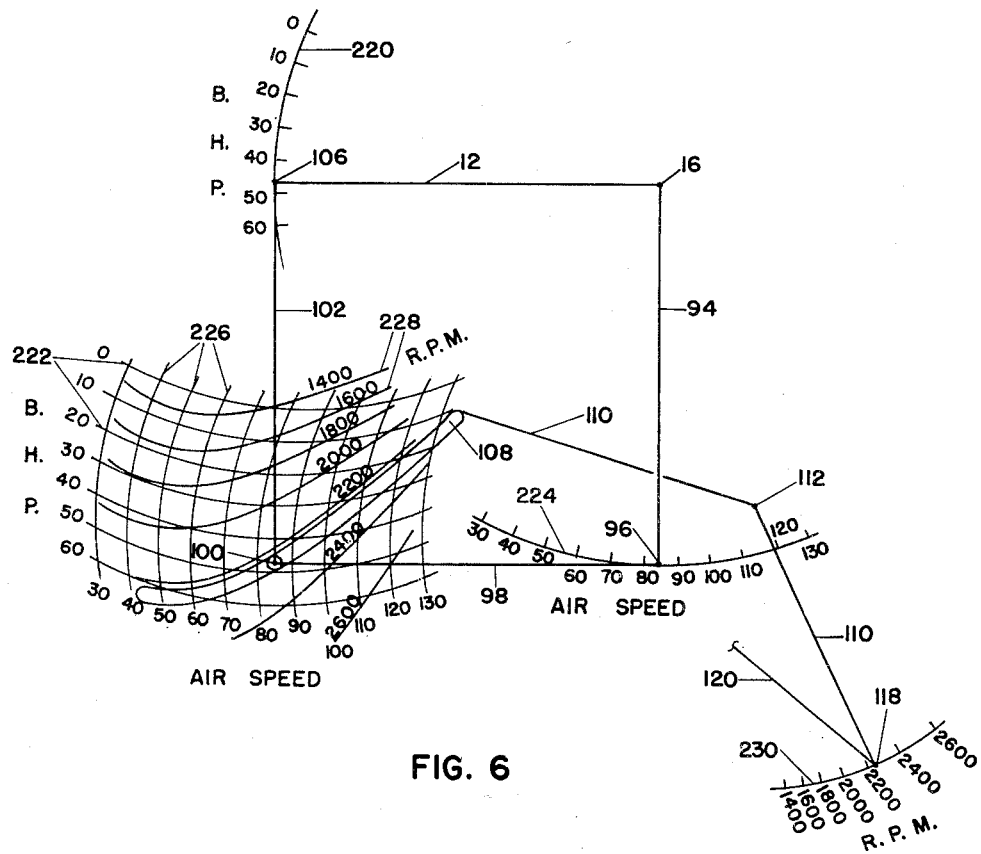
Fig. 6 is a schematic view showing the graphical basis for one of the computers of this invention, as well as a schematic super-imposition of the apparatus of the computer shown in connection with the graph.
Figure 7:
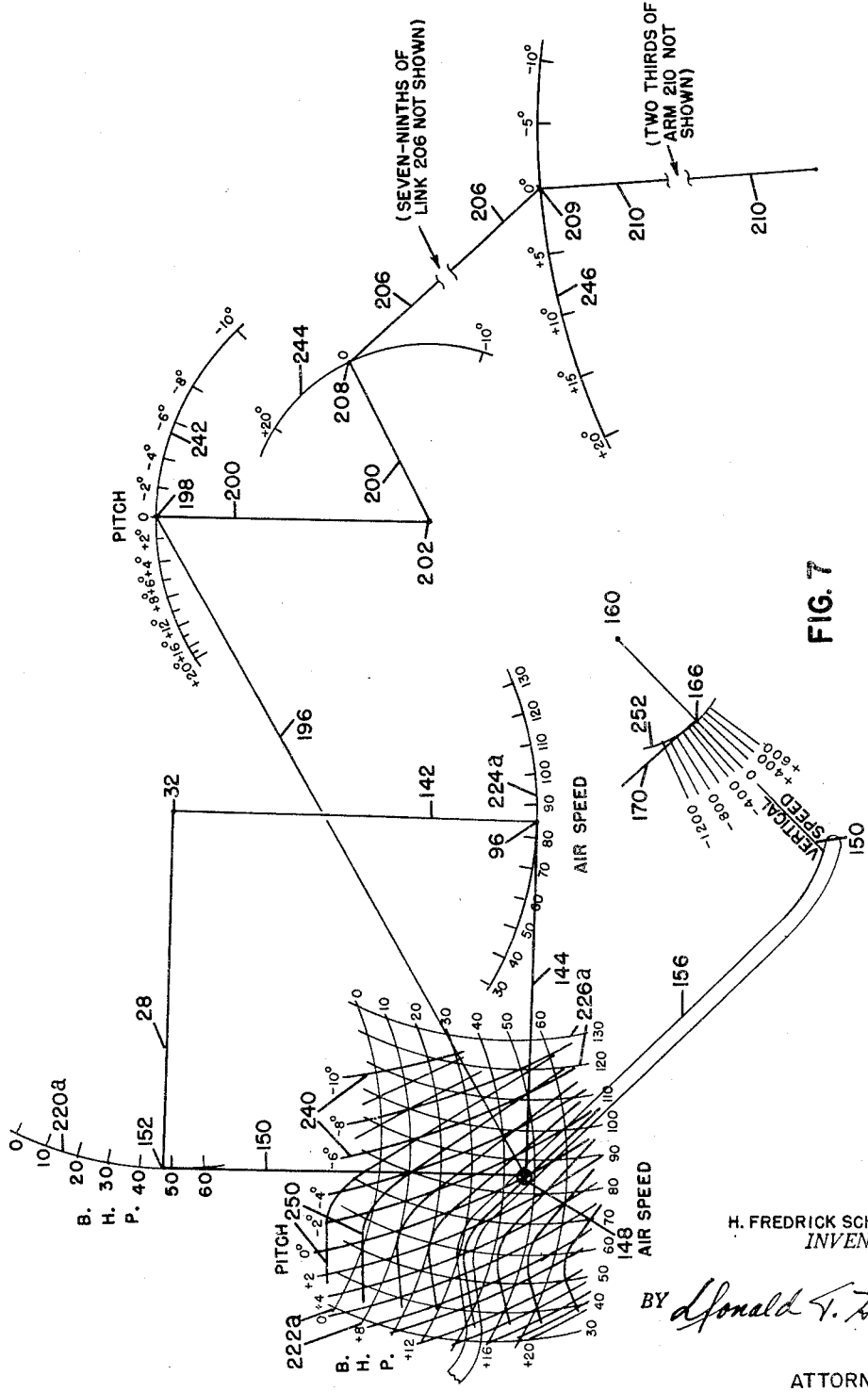
Fig. 7 is a view corresponding to the view shown in Fig. 6 except that it relates to the other computer of this invention.

Of the foregoing, Figs. 6 and 7 show the exact relative positions of the fixed pivots and lengths of the links of the disclosured embodiments of the invention.

Reference is now made to Fig. 1 wherein the lever 10 is disclosed, this lever representing the throttle control lever in the plane represented by the trainer in which the apparatus of this invention is incorporated. The lower end of lever 10 is affixed to the plate 12 by means of screws 14, plate 12 being affixed upon the shaft 16 to position the same according to the instant position of the simulated throttle control lever 10. The far end of shaft 16 is rotatably mounted in the bracket 18 which is suitably fixed within the fuselage (not shown) of the trainer. Welded to the near side of the plate 12 is the nut 20 in which is fitted the far end of screw 22 which passes through the slot 24 in bracket 18. This arrangement is provided to limit the movement of the lever 10, just as the movement of the throttle control lever of a real plane is similarly limited.

Referring also to Fig. 2, it will be seen that a three leaf valve designated generally by 25 is provided, the leaves of this valve being numbered 26, 28, and 30. The leaf 26 is affixed upon shaft 16 by pin 27 to rotate therewith in response to movements of the simulated throttle control lever 10; the leaf 28 is freely mounted upon one end of the shaft 32 which is coaxial with the shaft 16, the other end of shaft 32 being carried by the bracket 34 which lies in a plane parallel to the plane of bracket 18 and which is suitably affixed within the fuselage of the trainer; while the third leaf 30 carries a pin 36 which passes through the leaf spring 38 which in turn is affixed to the bracket 34, the lower end of the leaf spring 38 being bifurcated to permit a straddling of the shaft 32. It will be appreciated that this particular arrangement prevents rotation of the leaf 30.

Reference is now made to Fig. 3 for a detailed disclosure of the construction of the three leaf valve 25. The leaf 26 includes a port 40 which passes completely therethrough and which is consequently vented to the atmosphere. Diametrically opposed to the port 40 is the port 42 placed in the near face of the leaf 26 and which passes partially through the leaf to communicate with the port 44 herein which extends radially of the leaf from the periphery thereof inwardly. The coupling 46 is fitted inside the port 44, and referring to Fig. 1 it will be seen that the pneumatic line 48 connects the coupling 46 with the turbine 50 in order that the pressure within port 42 may be at all times reduced below atmospheric pressure. The center of leaf 26 is drilled at 52 for the mounting of this leaf upon the previously mentioned shaft 16.

The middle leaf 28 includes a pair of arcuate slots 54 and 56 which pass completely through leaf 28, the adjacent ends of these slots being separated by the necks 58 and 60. The diameters of the ports 40 and 42 in the leaf 26 are such that when the leaves 26 and 28 are neutrally positioned with respect to one another the ports 40 and 42 overlie the necks 58 and 60 and slightly overlap the adjacent ends of each of the arcuate slots 54 and 56. Accordingly, when the leaves 26 and 28 are neutrally positioned with respect to one another, an equal amount of atmosphere and vacuum are supplied by the ports 40 and 42 to each of the arcuate slots 54 and 56. The leaf 28 is drilled at 62 to permit mounting of the leaf 28 upon the end of shaft 32, and the outer end of the leaf 28 is drilled completely therethrough at 64 for a purpose to be described.

Considering now the detailed construction of the third leaf 30, it will be seen that the inner face of this leaf has a port 66 opening therethrough, which port extends into the leaf 30 to communicate with the port 68 which extends radially of the leaf and opens through the periphery thereof. The coupling 70 is fitted into the outer end of port 68, and the pneumatic line 72 shown in Fig. 1 connects the coupling 70 with the cylinder 72 which is affixed upon the base plate 74 which in turn is affixed to the bracket 34. The inner face of the leaf 30 has a second port 76 which is diametrically opposed to the port 66, port 76 extending inwardly of leaf 30 to communicate with the port 78 which extends radially of leaf 30 and which opens through the periphery thereof. The coupling 80 is fitted into the outer end of port 78, and as seen in Fig. 1 the pneumatic line 82 connects coupling 80 with the cylinder 83 which is also carried by the fixed plate 74. The ports 66 and 76 are positioned in leaf 30 so that when the center leaf 28 of the valve is in its neutral position the port 66 overlies the center of the arcuate slot 54, and port 76 overlies the center of the arcuate slot 56. The pin 36 carried by the outer face of leaf 30 is shown in Fig. 3, while the center of this leaf is drilled at 82 to permit the mounting of leaf 30 upon the shaft 32. Ports 40 and 42, arcuate slots 54 and 56 and ports 66 and 76 are all displaced an equal distance from an axis through the centers of the shafts 16 and 32.

Referring back to Fig. 1, the arm 84 is affixed upon the near end of shaft 32 to position the same, and the upper end of the piston 86 is pivoted to the left end of arm 84 by pivot 88, the lower end of piston 86 carrying disc 87 in cylinder 73. The upper end of piston 90 is pivoted to the right end of arm 84 by pin 92, the lower end of piston 90 being affixed to the disc 93 in cylinder 83.

Still referring to Fig. 1, the upper end of link 94 is freely mounted upon the far end of the horizontal transfer shaft 16, the lower end of link 94 being pinned to the far end of the shaft 96 which runs parallel to shaft 16. The right end of the link 98 is freely mounted upon the far end of shaft 96, while the forward end of link 98 carries the first master pivot 100. The lower end of the link 102 pivots upon the master pivot 100 and the upper end of link 102 is pivoted upon the pin 106 carried by the far side of the plate 12. The master pivot 100 projects beyond the link 102 and passes through the cam slot 108, shaped as shown, and formed in the plate 110 which is pivotally carried by the pin 112 which in turn is carried by the outer end of the bracket 114 which is fixedly attached to the bracket 18 by means of pins 116. The lower right corner of cam plate 110 carries the stud 118 to which is attached the lower end of the cable 120 which passes around the pulley 122 which is freely mounted upon the rod 124 which is affixed within the trainer fuselage. The upper end of cable 120 extends to the instrument designated generally by 126 which simulates the tachometer of a real plane. The detailed construction of the simulated tachometer 126 is shown in Fig. 4, wherein it will be seen that this instrument comprises essentially a shaft 128 upon which is mounted the needle indicator 130 which is arranged to move over the dial 132 which is calibrated like the tachometer of a real plane. A pulley 134 is affixed upon the shaft 128, and the upper end of cable 120 encircles this pulley and is attached to the lower end of spring 137, the upper end of which is attached to the fixed member 138 which may be behind the instrument panel (not shown) in the trainer. The pulley 134 and shaft 128 are biased by the spring 137 to keep the cable 120 taut at all times.

Referring back to Fig. 1, it will be seen that the arm 142 is provided, the upper end of this arm being affixed to the shaft 32 by pin 143 to rotate therewith and the lower end being affixed to the near end of shaft 96. The right end of link 144 is freely mounted upon the near end of shaft 96, and the left end of link 144 is carried by the second master pivot 148, as better seen in Fig. 5. The lower end of link 150 is also carried by master pivot 148, the upper end of link 150 being carried by the pin 152 which projects through the hole 64 in the outer end of the center leaf 28 shown in Fig. 3.

The pin 154 is also carried upon the near side of the lower end of link 150 and projects outwardly to overlie the link 144 for a purpose to be described.

The master pivot 148 also projects through the slot 156 in the cam plate 158, slot 156 being shaped generally as shown. The right end of plate 158 is pivoted upon the pin 160 which is carried by the lower end of bracket 162 which is affixed to the bracket 34 by means of screws 164. The plate 158 carries a pin 166 positioned near the pivot 160, and this pin carries the threaded screw eye 168 to the forward end of which is attached the lower end of the cable 170. Cable 170 passes around the pulley 172 which is freely mounted upon the fixed rod 124, the upper end of cable 170 being connected to the instrument designated generally by 174, which instrument simulates the vertical speed indicator of a real plane. This instrument includes a shaft 176 and an indicating needle 178 which is arranged to move over the dial 180 which is calibrated to simulate the dial of the vertical speed indicator of a real plane. The internal construction of the simulated vertical speed indicator 174 may be like that shown in Fig. 4, and therefore a further discussion of the same is deemed unnecessary.

In Fig. 1 it will be seen that the far side of arm 84 carries the eye 182 to which is affixed the lower end of the cable 184. This cable passes around the pulley 186 which is freely mounted upon the rod 124, the upper end of cable 184 being connected to the indicator 188 which simulates the air speed indicator of a real plane. This indicator includes the shaft 190 upon which is affixed the needle 192 which is arranged to move over the dial 194 which is calibrated to simulate the air speed indicator of a real plane. The internal construction of the simulated air speed indicator 188 is like that shown in Fig. 4, and consequently a further detailed disclosure of the same is not deemed necessary.

Also disclosed in Fig. 1 is the arcuate link 196, the lower end of which is carried by the second master pivot 148, and the upper end of which is freely mounted upon the pin 198 which is fixedly carried by the plate 200. The torsion spring 201 encircles pin 198 and has its far end affixed to the plate 200 and its near end affixed to the arcuate link 196, this spring being arranged to bias the link 196 in the clockwise direction for a purpose to be described. The plate 200 is pivoted upon the pin 202, the far end of which is carried by the fixed bracket 18, and the torsion spring 204 encircles this pin, one end of this spring being affixed to the bracket 18 and the other to the plate 200 to bias the plate in the counter-clockwise direction for a purpose to be described. The upper end of the link 206 is attached to pivot 208 carried by the plate 200, and affixed upon this link is the washer 217 against which bears the upper end of spring 218, the lower end of which bears against one end of slider 219 which is freely mounted upon link 206. The lower end of link 206 carries the stop 219a. Pivot 209 carried by the upper end of arm 210 interconnects arm 210 and slider 219. The lower end of arm 210 is mounted upon the fixed pivot 211. The attitude unit is shown in block form and designated 212, this unit being connected to arm 210 by means of link 213 to position the arm 210 about pivot 211 according to the instant assumed attitude of the plane represented by the trainer about its transverse axis. The attitude unit 212 is operable in response to changes in the attitude of the fuselage of the trainer about its transverse axis to position the arm at all times in accordance with the climbing and diving position of the fuselage, when my invention is incorporated in a trainer comprising a movable fuselage such as is disclosed in United States Patents 1,825,462 and 2,099,857. When my invention is incorporated in a fuselage which does not move about its transverse axis to simulate the climbing and diving of a plane in actual flight, the attitude unit 212 positions the arm 210 about pivot 211 according to the assumed position of the plane represented by the trainer about the transverse axis.

The four-bar computer comprising elements 12, 102, 98 and 94 is designated generally in Fig. 1 by 214, while the four-bar computer comprising elements 28, 150, 144 and 142 is designated generally by 216.

The graphical and theoretical basis of the apparatus of this invention will now be explained by reference to Figs. 6 and 7, Fig. 6 disclosing the graphical basis of the computer 214 and Fig. 7 disclosing the graphical basis of the computer 216. In Fig. 6, the location of the fixed pivot 16 which is the axis of shaft 16 was selected, and a suitable length chosen for the link 12 which connects the pivots 16 and 106. The brake horsepower arc 220 was then drawn employing the location of the fixed pivot 16 as a center and the selected length of link 12 as a radius. This arc was then divided into suitable increments of equal length, and the dividing points were numbered in increments of 10 from zero through 60, representing different values of assumed brake horsepower. Then, selecting a radius equal to the desired length of the link 102, and employing each of the division marks along the brake horsepower arc 220 as a center, the brake horsepower curves 222 were drawn, and each of these curves was numbered with the same number as the division mark along arc 220 serving as its center. Then, employing a radius equal to the desired length of the link 94 and using the location of the fixed pivot 16 as a center, the air speed arc 224 was described. This arc was then divided into suitable increments of equal length, and the dividing points along this arc were numbered in increments of 10 from 30 through 130, representing miles of assumed air speed. Then, employing each of the dividing marks along arc 224 as a center, and using a radius equal to the desired length of link 98, the air speed curves 226 were drawn across the brake horsepower curves 222. Each of the air speed curves 226 was labelled with the same value as the point along the air speed arc 224 serving as its center. In the illustrated case, the links 12, 102, 98, and 94 are all of an equal length, but such need not necessarily be the case in practising the invention disclosed herein.

The engine speed curves 228 were then plotted in relative to the air speed curves 226 and brake horsepower curves 222 to give reasonable engine speeds for various combinations of air speed and brake horsepower. For example, the selected cruising condition is an air speed of 85 miles per hour and a brake horsepower of 47 with an engine speed of 2250 R. P. M. At an air speed of 80 miles per hour and a brake horsepower of 30, an engine speed of 2000 R. P. M. is produced.

The shape of the cam slot 108 was then selected as an average of the shapes of the engine speed curves 228, giving preference to the shapes of the curves near the cruising engine speed, and then the location of the fixed pivot 112 of the cam 110 was selected so that when cam 110 is pivoted about the selected point 112 the slot 108 would successively overlie the engine speed curves 228.

In view of the fact that the engine speed curves 228 are non-linearly spaced and yet the curves are linearly graduated, i. e., the distance between each curve represents a difference of 200 R. P. M., as the cam 110 moves linearly insofar as the numerical value of the engine speed curves 228 are concerned the cam rotates non-linearly about the fixed pivot 112. Inasmuch as the dial 132 of the simulated tachometer 126 of Figs. 1 and 4 is graduated linearly, means must be supplied to convert the non-linear rotation of cam 110 into a linear movement of cable 120 which operates the simulated tachometer in response to movements of the cam 110. This is accomplished by attaching the lower end of cable 120 at the pivot 118 at the angle shown. The movement of pivot 118 about pivot 112 describes the R. P. M. arc 230, and this arc is graduated with the same values of engine speed as the engine speed curves 228. When the cam slot 108 overlies the 1400 R. P. M. curve 228, pivot 118 is above the 1400 R. P. M.

mark on arc 230, etc. Pivot 118 moves non-linearly along arc 230 with respect to changes in assumed engine speed, but cable 120 is moved linearly with changes in assumed engine speed.

Reference is now made to Fig. 7 which discloses the graphical basis of the second four-bar computer comprising members 28, 150, 144 and 142 which are equal in length to the members 12, 102, 98 and 94 of the first computer. The fixed pivot 32 is on the same axis as the fixed pivot 16 of the first computer, and pivot 96 is the axis of the same shaft as pivot 96 of the first computer. The brake horsepower arc 220a, brake horsepower curves 222a, air speed arc 224a and air speed curves 226a are all produced exactly as their counterparts shown in Fig. 6, and are of the same dimensions and occupy the same relative positions as their counterparts in Fig. 6.

The pitch curves 240 numbered from minus 10 to plus 20, representing assumed pitch attitudes in degrees, were plotted in relative to the brake horsepower curves 222a and air speed curves 226a to give reasonable pitch required values for the various combinations of air speed and brake horsepower, or expressed differently, to give reasonable air speeds for various combinations of brake horsepower and pitch, or expressed still differently, to give reasonable brake horsepower required values for various combinations of air speed and pitch.

The pitch curves 240 were chosen as the arcs of a circle of equal radius, and the center of each of these curves was plotted, and these centers were found to describe the pitch arc 242. The center of the pitch arc 242 was located and is the fixed pivot 202, shown in Fig. 1 in the form of the shaft of the same number. Each point along the pitch arc 242 which is the center of a pitch curve 240 was labelled with the same value as the pitch curve 240 of which it is the center. The length of link 196 was selected as being equal to the radius of the pitch curves 240, and the distance from pivot 198 to pivot 202 is equal to the radius of arc 242.

In view of the fact that the pitch curves 240 are non-linearly spaced and yet the curves are graduated linearly, i. e., the distance between each curve represents a difference of two degrees of change in assumed attitude, and inasmuch as the pivot 198 moves along arc 242 and pivot 208 moves along arc 244 non-linearly for equal changes in attitude, while the arm 210 moves linearly along the pitch arc 246 with respect to changes in assumed or actual trainer attitude—depending on whether the trainer includes a movable fuselage—means must be provided for converting the linear motion of arm 210 into a non-linear movement of bellcrank plate 208 and pivots 208 and 198. This conversion is accomplished by interconnecting the pivot 208 carried by the bellcrank plate 209 with pivot 209 carried by the upper end of arm 210 by means of link 206, at the angle shown. As indicated upon Fig. 7 of the drawing, only two-ninths of the length of link 206, and only one-third of the length of arm 210 of the preferred embodiment of the invention are shown, because of the limitations of space.

Having devised the trainer pitch input system, the vertical speed curves 250 were then plotted in relative to the air speed curves 226a and pitch curves 240 to give reasonable values of vertical speeds for various combinations of air speed and pitch.

The shape of the cam slot 156 was then selected as an average of the shapes of the vertical speed curves 250, giving preference to the shapes of the curves near the zero vertical speed curve 250, and then the location of the fixed pivot 160 was selected so that when cam 110 is pivoted about the selected point 160 the slot 156 successively overlies the vertical speed curves 250. It was found that the vertical speed cam 158 was rotated reasonably linearly about the pivot 160 in response to changes in the position of the cam slot 156 from overlying one of the vertical speed curves 250 to the adjacent ones, and consequently, in order to move the cable 170 linearly in response to changes in assumed vertical speed, it was merely necessary to attach one end of cable 170 to pivot 166 as shown, the movement of this pivot describing the vertical speed arc 252.

It will be appreciated that the locations of the pivots and lengths of the arms, linkages, arcs, etc., and shape of the cams of the computers were not determined by formula, but were selected by trial and error, and were finally selected as disclosed in the drawings, due regard being given to the required accuracy of the simulation of the actual flight characteristics of the plane being simulated.

Considering now the operation of the apparatus of this invention, the structure and theoretical basis of which have been hereinbefore described, when the apparatus of the invention is in the assumed static cruising condition, the apparatus is positioned as shown in Figs. 1, 6 and 7. The master pivot 100 is positioned in the 85 miles per hour assumed air speed position, the assumed 47 brake horsepower available position and assumed 2250 R. P. M. position. The master pivot 148 is positioned in the assumed 85 miles per hour air speed position, assumed 47 brake horsepower required position, assumed zero pitch attitude position and assumed zero vertical speed position. Assuming that with the apparatus in the assumed static cruising condition, the throttle lever 10 is moved to the left in Fig. 1 to simulate the opening of the throttle of the plane represented by the trainer, the arm 12 moves about the axis of shaft 16 and, assuming that the graph shown in Fig. 6 is placed behind the pantograph 214, and properly oriented with respect thereto, the pivot 106 will move downwardly along the brake horsepower available arc 220 in direct relation to the magnitude of the forward movement of lever 10. The downward movement of pivot 106 will also result in a downward movement of the master pivot 100 relative to the brake horsepower available curves 222 so that the master pivot 100 will be immediately re-positioned relative to the brake horsepower available curves 222 in accordance with the brake horsepower which would be made available in response to the new setting of the lever 10. Inasmuch as no change in assumed air speed will immediately take place, the pivot 96 remains stationary in the 85 miles assumed air speed position along arc 224 so that the downward movement of the master pivot 100 wil be along the theoretical 85 miles per hour air speed curve.

Also, when the simulated throttle control lever 10 is moved ahead the shaft 16 is rotated counterclockwise as seen in Fig. 1, because the plate 12 is affixed upon the far end of shaft 16, and the valve leaf 26 which is also affixed upon shaft 16 will be rotated counterclockwise through the same angle and in the same direction as the simulated throttle control lever 10 and shaft 16 are rotated.

Referring to Fig. 3, the counterclockwise rotation of leaf 26 of valve 25 places the atmosphere port 40 over the arcuate slot 56 in leaf 28 and places the vacuum port 42 over the arcuate slot 54. By means of these two arcuate slots, atmosphere and vacuum are respectively admitted into into the ports 76 and 66 of the leaf 30, and by means of port 78, coupling 80 and pneumatic line 82, atmosphere is admitted to the cylinder 83, while by means of port 68, coupling 70 and pneumatic line 72, vacuum is admitted into the cylinder 73. The admission of atmosphere into the cylinder 83 and of vacuum into cylinder 73 results in a gradual downward movement of the piston 86 and in a gradual upward movement of piston 90, producing a counterclockwise rotation of the arm 84 and shaft 32 upon which this lever is fixedly mounted. Inasmuch as the upper end of arm 142 is also affixed upon shaft 32, this arm is also rotated counterclockwise, and referring to Fig. 7 and assuming that the graph disclosed in that figure is placed immediately behind the pantograph 216 shown in Fig. 1, and properly oriented with respect thereto, the pivot 96 will gradually be moved along the air speed arc 224a to the right, or in the direction of a higher assumed air speed. Assuming that the attitude of the trainer remains at the zero pitch attitude, the position of pivot 198 along the pitch arc 242 remains as shown in Fig. 7, and while the arm 142 is slowly moving counterclockwise the master pivot 148 is moved gradually downwardly along the zero pitch curve 240. Inasmuch as the center leaf 28 of the three leaf valve 25, which center leaf also forms one arm of the pantograph 216, is freely mounted upon the shaft 32, the downward movement of the master pivot 148 results in a downward movement of the pivot 152 along the brake horsepower required arc 220a and produces a counterclockwise rotation of the center leaf 28 of valve 25. When the center leaf 28 has been rotated counterclockwise through the same angle as the leaf 26 was originally rotated in response to the moving ahead of the simulated throttle control lever 10, the leaf 28 will have been re-positioned relative to leaf 26 to shut off the admission of atmospheric pressure into the cylinder 83 and of vacuum into the cylinder 73, the two cylinders will cease moving the pistons 86 and 90, and consequently the shaft 32, arm 142, link 144, master pivot 148, link 150, pivot 152 and center leaf 28 will be stationary. At the moment that this cessation of operation occurs, the pivot 152 will be on the same axis as the pivot 106, because both pivots will have been moved through the same angle as the simulated throttle control lever 10, and inasmuch as the arm 142 always remains parallel to the arm 94 because of the provision of the interconnecting rod 96, the two master pivots 148 and 100 will be upon the same axis. Such being the case, the pivot 152 will be positioned along the brake horsepower required arc 220a in the exact position corresponding to the position of pivot 106 along the brake horsepower available arc 220, and consequently the master pivot will have been positioned relative to the brake horsepower required curves 222a in the same position as the master pivot 100 was positioned by the throttle lever 10 relative to the brake horsepower available curves 222. By virtue of the fact that the pivot 198 has remained in the zero pitch position, the master pivot 148 will not have moved off from the zero pitch curve 240.

Consequently, the master pivot 148 is at the instant of cessation of operation of the apparatus positioned relative to the brake horsepower required curve 222a according to the instant assumed brake horsepower available, and is positioned relative to the pitch curve 240 in accordance with the instant assumed pitch attitude of the trainer. By virtue of the proper plotting of the brake horsepower required curves 222a, pitch curves 240 and air speed curves 226a of Fig. 7, it follows that the master pivot 148 will be positioned relative to the air speed curves 226a according to the instant assumed air speed of the trainer. Consequently, the master pivot 140 positions the pivot 96 along the air speed arc 224a according to the instant assumed air speed of the trainer and the rotational positions of the arms 142 and 84 about the axis of shaft 32 are also in accordance with the factor of instant assumed brake horsepower available and pitch attitude. By means of cable 184 the change in assumed air speed is transferred to the simulated air speed indicator 188 to position the needle 192 relative to dial 194 in accordance with the instant assumed air speed of the trainer. Consequently, the simulated air speed indicator 188 is operated by the apparatus of this invention to indicate a gradually greater assumed indicated air speed until the air speed for the new power available setting and pitch attitude is reached.

Inasmuch as the vertical speed curves 250 were properly plotted relative to the air speed curves 226a and pitch curves 240 to give the proper vertical speed reading for various combinations of air speed and pitch attitude, it will be appreciated that the master pivot 148 will also have been moved relative to the vertical speed curves 240, and will come to rest relative to the vertical speed curves in the correct vertical speed position for the prevailing air speed and pitch attitude. Such being the case, the position of the vertical speed cam 158 about the pivot 160 will be properly gradually changed and will be finally positioned according to the final assumed vertical speed. Consequently, the position of the pivot 166 carried by cam 158 is at all times a correct measure of the assumed vertical speed, and the cable 170 which is connected to this pivot will be properly positioned in accordance with the same assumed factor, resulting in a proper positioning of the indicating needle 178 relative to the dial 180 of the simulated vertical speed indicator 174 to indicate the proper assumed vertical speed. Inasmuch as the engine speed curves 228 in Fig. 6 are properly drawn relative to the air speed curves 226 and brake horsepower available curves 222, it will be appreciated that when the throttle control lever 10 was initially moved to the left in Fig. 1 to produce a higher assumed brake horsepower available, the downward movement of the master pivot 100 will produce a movement of the master pivot into a higher assumed engine speed position as shown by the engine speed curves 228. Consequently, the engine speed cam 110 is rotated counterclockwise about its fixed pivot 112, and the pivot 118 is moved along the engine speed arc 230 into the proper assumed engine speed position. By virtue of the angle of connection between cable 120 and pivot 118, the cable 120 was properly positioned according to the new assumed engine speed, and by means of cable 120 the needle 130 of the simulated tachometer 126 is properly positioned relative to the simulated tachometer dial 132 to indicate the new and higher proper assumed engine speed. This operation simulates the immediate increase in the speed of an engine of the type being simulated when the throttle lever is pressed ahead to provide a greater brake horsepower available. Then, as the pistons 86 and 90 are operated with the gradual resulting increase in assumed air speed and the pivot 96 is gradually moved to the right in Fig. 6 along the air speed arc 224 into a higher assumed air speed position, the master pivot 100 will be gradually moved to the right in Fig. 6 parallel to the brake horsepower available curves 222 and into a higher assumed engine speed position relative to the engine speed curves 228. By the just mentioned interconnecting apparatus, the assumed engine speed as indicated by the tachometer 126 gradually increases until the entire apparatus reaches the static operating condition.

In the event that the apparatus of this invention is positioned as shown in Figs. 1, 6 and 7 in the assumed static cruising condition, and the simulated throttle control lever 10 is moved to the rear to simulate the closing of the throttle of the plane represented by the trainer, the pivot 106 is moved upwardly into a lesser brake horsepower position relative to arc 220, and the master pivot 100 is moved about pivot 96 parallel to the air speed curves 226 and across the brake horsepower available curves 222 into the new and lesser brake horsepower available position. The far leaf 26 of the three leaf valve 25 is rotated clockwise in the same direction and through the same angle as the lever 10, and vacuum is admitted to the cylinder 83 while atmosphere is admitted to the cylinder 73. The operation of the two pistons 86 and 90 will result in a clockwise rotation of the arm 84, shaft 32, arm 142 and pivot 96 of Fig. 7. Inasmuch as the attitude pivot 198 remains stationary, the master pivot 148 will move upwardly along the zero pitch curve 240 at the same time that pivot 96 is moving to the left along the air speed curve 224a into a lower assumed air speed position. The movement of the master pivot 148 will result in an upward movement of the pivot 152 into a lower assumed brake horsepower required position, and the center leaf 28 of the three leaf valve will be rotated clockwise. This gradual operation of the apparatus continues until the center leaf 28 is rotated clockwise through the same angle as the throttle lever 10, link 12, shaft 16 and valve leaf 26 were rotated, at which instant the leaf 28 of the valve 25 will be positioned to shut off the application of vacuum to cylinder 83 and of atmosphere to cylinder 73, and the apparatus will again have reached the static operating condition. When the static operating condition has again been attained, the member 28 of the pantograph 216 will be parallel to the member 12 of the pantograph 214, and inasmuch as the arms 94 and 142 always remain parallel, the master pivot 148 will be positioned relative to the brake horsepower required curves 222a of Fig. 7 corresponding to the position of the master pivot 100 relative to the brake horsepower available curves 222 of Fig. 6. By virtue of the fact that the brake horsepower required curves 222a and pitch curves 240 are properly drawn relative to the air speed curves 226a, the positioning of the master pivot 148 along the zero pitch curve 240 relative to the brake horsepower required curves 222a, will necessarily properly position this pivot relative to the air speed curves 226a, and in the previously described fashion this positioning of the master pivot 148 relative to the air speed curves 226a is transferred to the simulated air speed indicator 188 to indicate the proper assumed air speed during the operation of the apparatus as well as at the cessation thereof. It is believed unnecessary to explain in detail that during the same period of operation the master pivot 148 will be properly moved relative to the vertical speed curves 250, and that the vertical speed indication given by the vertical speed indicator 174 during the operation as well as at the cessation thereof will be correct. Insofar as the reading given by the simulated tachometer 126 is concerned, upon the retarding of the simulated throttle control lever 10 the movement of the master pivot 100 upwardly will immediately result in a lower indicated assumed engine speed, and then as the pantograph 216 is operated to produce a lower indicated assumed air speed the reading of the simulated tachometer will be properly modified.

The operation of the apparatus of this invention in response to an assumed or actual change in the attitude of the trainer fuselage—depending upon whether the trainer employs a movable or stationary fuselage—is equally simple and accurate. Assuming that the apparatus is positioned as shown in Figs. 1, 6 and 7 in the static cruising position, and that the nose of the fuselage is lowered or is assumed to be lowered, to simulate the lowering of the nose of a plane in actual flight, the arm 210 will be rotated counterclockwise in the drawings and pivot 209 will move along arc 246 into the new attitude position. By means of link 206, pivot 208, plate 200, pivot 198 and link 196 the master pivot 148 will be moved across the pitch curves 240 into a nose-down position, and will be properly positioned relative to the pitch curves according to the degree of assumed dive. In this instant, the pivot 96 remains stationary, and so the master pivot 148 must move across the pitch curves 240 by moving upwardly along the cruising air speed curve 226a. This movement of the master pivot will result in an upward movement of the pivot 152 along the brake horsepower required arc 222a, and in a clockwise rotation of the center leaf 28 of the three leaf valve 25. Atmosphere will be admitted to the cylinder 83 and vacuum to the cylinder 73 resulting in a downward movement of piston 86 and in an upward movement of piston 90, producing a clockwise rotation of the arm 84, shaft 32, arm 142 and pivot 96. The pivot 96 will be gradually moved to the right along the air speed arc 224a into a higher assumed air speed position, and inasmuch as the pivot 198 will now be stationary, the master pivot 148 will be moved downwardly parallel to the pitch curves 240. This movement will result in a movement downwardly of the pivot 152 along the brake horsepower required arc 220a, and the center leaf 28 of the three leaf valve 25 will be rotated clockwise. The apparatus will continue to operate until the center leaf 28 and pivot 152 each has been returned to the same position which it occupied before the change in attitude occurred. When this return has been accomplished the pivot 152 will be properly positioned along the brake horsepower required curve 220a for the setting of the throttle control lever 10, and the master pivot 148 will be properly positioned relative to the brake horsepower required curves 222a. The master pivot 148 will be properly positioned relative to the pitch curves 240 for the instant assumed attitude, and will accordingly be positioned relative to the air speed curves 226a according to the brake horsepower available and pitch attitude. This positioning of the master pivot 148 is properly transferred through the previously described apparatus to the simulated air speed indicator 188 so that that indicator will indicate the proper assumed air speed. The same also applies while the position of the master pivot 148 is being changed during the operation of the apparatus to seek the new proper assumed air speed. It is believed unnecessary to explain in detail that the master pivot 148 is properly positioned relative to the vertical speed curves 250 to cause the vertical speed indicator 180 to indicate the proper assumed vertical speed. Insofar as the reading of the simulated tachometer 126 is concerned, when the change in attitude first occurs the position of master pivot 100 is not changed, but as the factor of assumed air speed is gradually increased the pivot 96 in Fig. 6 moves to the right, and inasmuch as pivot 106 remains stationary, the master pivot 100 is moved parallel to the brake horsepower available curves 222 and across the engine speed curves 228 into a higher assumed engine speed position. By means of the previously described apparatus, the interconnecting mechanism between the master pivot 100 and the simulated tachometer 126 will cause the simulated tachometer to indicate the proper higher assumed engine speed.

On the other hand, assuming that the apparatus is in the static cruising condition, and that the nose of the trainer is either actually raised above the zero attitude position, or assumed to be so raised—depending upon whether the trainer employs a movable or stationary fuselage—it will be appreciated that the pivot 96 in Fig. 7 momentarily remains stationary and that the master pivot 148 will be rotated by link 196 counterclockwise thereabout parallel to the air speed curves 226a and across the attitude curves 240 into a positive attitude position. The center leaf 28 of valve 25 will be rotated counterclockwise, admitting vacuum to the cylinder 83 and atmosphere to the cylinder 73, resulting in a clockwise rotation of the arm 84, shaft 32, arm 142 and pivot 96. The pivot 96 moves to the left along the air speed arc 224a into a lower assumed air speed position, and inasmuch as the pivot 198 is now held stationary by the attitude input, the master pivot 148 will be moved upwardly parallel to the pitch curves 240 and across the air speed curve 226a and brake horsepower required curves 222a into a lower assumed air speed and lower brake horsepower required position. The pivot 152 will similarly move upwardly along the brake horsepower arc 220a, and the center leaf 28 of valve 25 will be rotated clockwise. This operation of the apparatus will continue until the center leaf 28 has been returned to its neutral position relative to the leaf 26, at which instant the operation of the apparatus ceases. At the time of cessation of operation of the apparatus, the master pivot 148 will be positioned relative to the brake horsepower required curve 222a according to the position of the throttle control lever 10 and will be positioned relative to the pitch curve 240 in accordance with the assumed attitude of the trainer. Consequently, the pivot 148 will be positioned relative to the air speed curves 226a in accordance with the new assumed air speed, and this positioning of the master pivot 148 will gradually change the reading of the air speed indicator 188 to the new and final correct reading. At the same time the movement of the master pivot 148 relative to the vertical speed curves 250 will cause the vertical speed indication as given by indicator 174 to gradually change until the proper final assumed vertical speed is indicated thereby. Insofar as the reading given by the simulated tachometer 126 is concerned, no change in reading will occur immediately upon the change in assumed attitude, because the position of master pivot 100 will not be altered, but as the position of pivot 96 gradually changes in accordance with the change in assumed air speed resulting from the change in assumed attitude, the master pivot 100 will be moved about the pivot 106 counterclockwise into a lower assumed engine speed position relative to the engine speed curve 228, and this positioning of the master pivot 100 will be properly transferred to the simulated tachometer 126 through the previously described interconnecting apparatus.

The pin 154 disclosed in Fig. 1 carried by the lower end of link 150 is provided to prevent a toggling of the links 144 and 150 in the presence of the combination of a low assumed air speed and a high assumed nose-up position. When the pin 154 engages the top of link 144 before the full nose-up position of the master pivot 148 is realized, the spring 218 is merely compressed, thereby avoiding damage to the apparatus.

The link 196 is curved in form solely for the purpose of providing clearance with respect to the shaft 32.

Spring 201 is provided to bias arm 196 in the counterclockwise direction to assist in balancing the weight of arm 28 and link 150 which is applied to the master pivot 148, and spring 204 is provided to bias plate 200 in the counterclockwise direction so that in the presence of an extreme nose-down attitude the relative positions of the pivots 202, 198 and 208 will not result in a locking of the apparatus.

Reference is now made to Fig. 8 which shows a second embodiment of the follow-up means interposed between the two computers of this invention. It will be seen that the two computers 214 and 216 are the same as previously described, as is all of the other apparatus shown in the drawing, with the exception that the previously described pneumatically operated follow-up arrangement is replaced by the following:

In place of the two coaxial shafts 16 and 32 of Fig. 1 there is provided a single shaft 300 upon the far end of which is freely mounted the upper end of link 94 of computer 214 and upon which shaft is fixed the plate 12. The same end of shaft 300 is rotatably carried by bracket 18. The near end of shaft 300 is rotatably mounted in the bracket 34, and the upper end of link 142 is pinned to hub 302 which is freely mounted upon shaft 300, arm 84 being affixed to hub 302. The upper end of link 304 is pivoted to arm 84 at 306, the lower end of this link being connected to the plunger 306 of dashpot 308 by means of screw 310 and adjusting nut 312. Dashpot 308 is mounted on bracket 74.

A pulley 314 is fixed upon shaft 300 by means of set screw 316, as also shown in Fig. 9, and cable 318 is affixed to this pulley by screw 320 in order to provide a positive drive between the pulley and cable. The upper branch of cable 318 passes around pulley 322 which is freely mounted upon rod 324 held by fixed brackets 326, and then turns downwardly and has one end affixed to the block 328 by means of fitting 329, block 328 being affixed upon the slider 330 of the positive center compensator spring assembly designated generally by 332. The adjacent end of cable 318a, which in effect is a continuation of cable 318, is affixed to block 328 by means of fitting 329 and extends downwardly around pulley 334 which is freely mounted upon the rod 336 carried by bracket 338 affixed upon the base plate 74. Cable 318a is then turned upwardly to engage the outside fitting 340 which together with the interior fitting 342 forms a cable tightening arrangement. Cable 318 continues upwardly around pulley 344 which is rotatably mounted upon rod 346 carried by the fixed brackets 348 and then turns to the right to encircle pulley 314.

The pulley 350 is freely mounted upon shaft 309 and the arm 28a which corresponds to the arm 28 of computer 216 of Fig. 1 is affixed to pulley 350 by means of screws 352. The cable 354 encircles pulley 350 and is affixed thereto by means of screw 356 to provide a positive driving connection between the cable and pulley. The upper branch of this cable extends to the left around pulley 358 which is freely mounted upon rod 324, and then extends downwardly to engage the fitting 360 carried by the upper end of the rod 362 of the spring compensator assembly 332. Cable 354a which is in effect a continuation of cable 354 has its upper end attached to the fitting 360 and extends downwardly around pulley 362 which is freely mounted upon the rod 336. Cable 354a then extends upwardly to engage the exterior fitting member 364 which together with the interior member 366 constitutes a second cable tightening arrangement. The other end of cable 354 is attached to member 366 and continues upwardly around pulley 368 and then to the right to pulley 350.

The vertical rod 362 is slidably mounted in the blocks 370 which are affixed to the fixed bracket 372 by means of the nuts and screws 274.

Reference is now made to Fig. 10 which is a cross-sectional view of the positive center compensator spring assembly designated generally by 332. In Fig. 10 it will be seen that the bushing 376 is affixed upon rod 362 and the movable sleeve 330 encircles this bushing. The washer 378 engages the upper end of the bushing 376 and sleeve 330, when the assembly is in its neutral position, and the lower end of the compression spring 380 bears against washer 378. The upper end of spring 380 bears against washer 382 which in turn engages cotter pin 384. The washer 386 engages the lower ends of the bushing 376 and sleeve 330, when the assembly is neutralized, and the upper end of compression spring 388 bears against washer 386. The lower end of compression spring 388 bears against washer 390 and this washer is retained on rod 362 by cotter pin 392.

The operation of the positive center compensator spring assembly follow-up system is as follows:

When the simulated throttle control lever 10 is moved from the static cruising position as shown in Fig. 8 to the left to simulate an increase in assumed brake horsepower available, the pivot 106 is moved downwardly as previously explained, and the master pivot 100 of computer 214 is similarly moved downwardly, pivoting about the axis of shaft 96. The shaft 300 and pulley 314 rotate through the same angle as the lever 10 and pivot 106, and by means of cables 318 and 318a the block 328 and slider 330 of the spring compensator assembly 332 are moved downwardly. Inasmuch as the cables 354 and 354a momentarily remain stationary, the downward movement of slider 330 compresses the lower compression spring 388. The compression of spring 388 then forces the sliding rod 362 downwardly, but inasmuch as the sliding rod 362 is connected to the dashpot 308 through the cables 354 and 354a, pulley 350, arms 28a, 150, 144 and 142 of the computer 216, hub 302, arm 84 and link 304, the downward movement of the sliding rod 362 will be gradual and delayed. As rod 362 moves downwardly the two cables 354 and 354a will be moved counterclockwise, rotating pulley 350 and arm 28a in the same direction. The counterclockwise rotation of the arm 28a of computer 216 will result in a downward movement of the master pivot 148 of computer 216, and inasmuch as the attitude input pivot 198 is assumed to be held stationary, the movement of the master pivot 148 is along the proper pitch curve 240. The follow-up action continues until the pulley 350 and arm 28a have been rotated counterclockwise through the same angle as the arm 12 and pulley 314 were initially rotated, at which instant the two compression springs 380 and 388 will have been neutralized, and the follow-up action will cease. At that instant the arm 28a will be parallel to the arm 12 and inasmuch as arms 94 and 142 remain parallel at all times, the computer 216 will be positioned exactly like the computer 214, as previously explained in connection with the description of the embodiment disclosed in Fig. 1.

Throughout the entire process the two master pivots 140 and 148 will operate the cams 110 and 158 to cause the simulated vertical speed indicator 174 and simulated tachometer 126 to give proper indications, and the arm 84 through the interconnecting apparatus causes the simulated air speed indicator 188 to indicate the proper assumed changing air speed.

It is believed unnecessary to explain in detail the operation of the apparatus shown in Fig. 8 when the simulated throttle control lever 10 is moved in the opposite direction simulating a decrease in the assumed brake horsepower available. The upper compression spring 380 will be compressed in response to such a movement of the lever 10, and the spring assembly 332 will operate the follow-up apparatus and computer 216 in the reverse direction until computer 216 has been re-aligned with computer 214.

The operation of the apparatus disclosed in Fig. 8 in response to a change in assumed pitch attitude is as follows:

Assuming that the pitch attitude changes from cruising to a positive pitch attitude, the pivot 198 is rotated counterclockwise and by means of link 196 the master pivot 148 of computer 216 is moved downwardly pivoting about the axis of shaft 96. The downward movement of pivot 148 results in a similar movement of link 150 and in a counterclockwise rotation of arm 28a and pulley 350. The cables 354 and 354a are rotated counterclockwise moving the rod 362 of the spring compensating assembly 332 downwardly, compressing spring 388. Inasmuch as the cables 318 and 318a are held stationary by pulley 314, the compression of spring 388 then forces slider 362 upwardly, rotating the cables 354 and 354a clockwise, causing pulley 350 to rotate in the same direction. The arm 28a of computer 216 is similarly rotated clockwise and link 150 and master pivot 148 move upwardly along the selected pitch curve 240, moving the link 144 and the shaft 96 to the left, and by means of shaft 96 the computer 214 is operated, as previously explained in connection with Fig. 1.

This action continuues until the arm 28a has been returned to the same position as it occupied prior to the change in attitude input, at which instant the springs 380 and 388 will be neutralized. The follow-up action will be properly delayed because of the interconnection between the computer 216 and the dashpot 308. The air speed, vertical speed, and engine speed indications as given by the three indicators will be properly modified throughout the operation of the apparatus.

It is believed unnecessary to explain in detail that when the pivot 198 is moved in the opposite direction in response to an assumed lowering of the nose of the plane represented by the trainer, the spring follow-up arrangement properly operates the computers 216 and 214 as explained in connection with Fig. 1 to change the instrument indications.

It will be appreciated that the basic operation of the computers 214 and 216, when combined with the follow-up arrangement disclosed in Fig. 8, is the same as previously described in connection with the apparatus disclosed in Fig. 1.

In view of the preceding disclosure it will be appreciated that the apparatus of this invention is a novel form of flight computer which may be easily and cheaply manufactured, and which nevertheless accurately computes the factors of assumed engine speed, assumed vertical speed and assumed air speed in accordance with the input factors of brake horsepower available and pitch attitude. The double pantograph arrangement is provided in order that the position of the master pivot which controls the air speed and vertical speed reading may be gradually changed in response to a change in the brake horsepower available or attitude input, to simulate the gradual changes which occur in the corresponding instrument indications in a plane in actual flight. It will be appreciated that numerous changes may be made from the disclosed embodiment of my invention without departing from the substance thereof, and in particular other means than the disclosed valve and pneumatic means and spring means may be employed as a motive force for operating the second pantograph arrangement in response to changes in the factor of brake horsepower available and assumed attitude. Furthermore, certain of the principles of this invention may be employed and incorporated in other computers for computing different output factors in response to the same or different input factors, or for computing the same output factors in response to different input factors.

All such changes in construction and other uses for the substance of this invention are intended to be covered by the following claims.

I claim:

1. A computing mechanism for use in grounded aviation trainers and the like comprising two computers, each of said computers comprising a fixed pivot, a first link and a second link each having one end carried by said fixed pivot, a second pivot carried by the other end of said first link and a third pivot carried by the other end of said second link, a third link having one end carried by said second pivot and a fourth link having one end carried by said third pivot, and a fourth pivot carrying the second ends of said third and fourth links, the said fixed pivots being coaxial; a rod interconnecting the second pivot of each of said computers and extending parallel to the axes of said fixed pivots; input means connected to the first of said computers for moving the third pivot thereof about the fixed pivot of the computer in response to changes in the value of an input factor, and follow-up means operated by said input means and connected to the second computer for moving the third pivot of the second computer through the same angle and in the same direction as the movement of the third pivot of the first computer.

2. A computing mechanism for use in grounded aviation trainers and the like comprising two computers, each of said computers comprising a fixed pivot, a first link and a second link each having one end carried by said fixed pivot, a second pivot carried by the other end of said first link and a third pivot carried by the other end of said second link, a third link having one end carried by said second pivot and a fourth link having one end carried by said third pivot, and a fourth pivot carrying the second ends of said third and fourth links, the said fixed pivots being co-axial; a rod interconnecting the second pivot of each of said computers and extending parallel to the axes of said fixed pivot; input means connected to the first of said computers for moving the third pivot thereof about the fixed pivot of the computer in response to changes in the value of an input factor; an additional link connected to the fourth pivot of the second computer for controlling the direction of movement thereof; and follow-up means operated by said input means and connected to the first link of the second computer for moving the third pivot of the second computer through the same angle and in the same direction as the movement of the third pivot of the first computer.

3. The apparatus set forth in claim one in which the input means connected to the third pivot of the first computer and operating the follow-up means is a lever simulating the throttle control lever of a real plane.

4. The apparatus set forth in claim one in which the follow-up means is in the form of a valve-controlled pneumatically operated apparatus, the valve comprising a first leaf rotatable with the third pivot of the first computer and a second leaf adjacent the first leaf rotatable with the third pivot of the second computer.

5. The apparatus set forth in claim one in which the follow-up means is in the form of a positive-center compensator spring assembly driving means.

6. A computing mechanism for use in grounded aviation trainers and the like comprising two computers, each of said computers comprising a fixed pivot, a first link and a second link each having one end carried by said fixed pivot, a second pivot carried by the other end of said first link and a third pivot carried by the other end of said second link, a third link having one end carried by said second pivot and a fourth link having one end carried by said third pivot, and a fourth pivot carrying the second ends of said third and fourth links, the said fixed pivots being co-axial; a rod interconnecting the second pivot of each of said computers and extending parallel to the axes of said fixed pivots; input means connected to the second of said computers for moving the third pivot thereof about the fixed pivot of the computer in response to changes in the value of an input factor; and follow-up means operated by the movement of said third pivot and connected to the second computer for moving all four links of the second computer and all but the second link of the first computer until the third pivot of the second computer has been returned to its original position.

7. A computing mechanism for use in grounded aviation trainers and the like comprising two computers, each of said computers comprising a fixed pivot, a first link and a second link each having one end carried by said fixed pivot, a second pivot carried by the other end of said first link and a third pivot carried by the other end of said second link, a third link having one end carried by said second pivot and a fourth link having one end carried by said third pivot, and a fourth pivot carrying the second ends of said third and fourth links, the said fixed pivots being co-axial; a rod interconnecting the second pivot of each of said computers and extending parallel to the axes of said fixed pivots; a first input means connected to the first of said computers for moving the third pivot thereof about the fixed pivot of the computer in response to changes in the value of a first input factor; a second input means connected to the second of said computers for moving the third pivot thereof about the fixed pivot of the computer in response to changes in the value of a second input factor; and follow-up means selectively operated by said input means and connected to said second computer for moving all four links of the second computer and all but the second link of the first computer until the third pivot of the second computer has been moved through the same angle and in the same direction as the movement of the third pivot of the first computer in response to changes in the value of said first input means, and for moving all four links of the second computer and all but the second link of the first computer until the third pivot of the second computer has been returned to its original position in response to changes in the value of said second input means.

8. The apparatus set forth in claim one in which the input means connected to the third pivot of the first computer is in the form of a lever simulating the throttle control of a real plane together with an instrument simulating the vertical speed indicator of a real plane operated by movements of the fourth pivot of the second computer to give a reading dependent upon the position of the said fourth pivot.

9. The apparatus set forth in claim one in which the input means connected to the third pivot of the first computer is in the form of a lever simulating the throttle control of a real plane together with an instrument simulating the tachometer of a real plane operated by movements of the fourth pivot of the first computer to give a reading dependent upon the position of the said fourth pivot.

10. The apparatus set forth in claim seven in which the first input means is in the form of a lever simulating the throttle control lever of a real plane, and the second input means is operated by a unit operable in response to changes in the assumed pitch attitude of the plane represented by the trainer.

11. The apparatus set forth in claim ten together with an instrument simulating the air speed indicator of a real plane operated according to the position of the fourth pivot of one of the computers to give a reading dependent upon the position of said pivot.

12. The apparatus set forth in claim seven in which the first input means is in the form of a lever simulating the throttle control of a real plane, and the second input means is operated by a unit operable in response to changes in the assumed pitch attitude of the plane represented by the trainer, together with an instrument simulating the vertical speed indicator of a real plane operated by movements of the fourth pivot of the second computer to give a reading dependent upon the position of said pivot.

H. FREDERICK SCHAEFER, Jr.

REFERENCES CITED

The following references are of record in the file of this patent:

UNITED STATES PATENTS

| Number | Name | Date |
| --- | --- | --- |
| 2,093,254 | Spitzglass et al. | Sept. 14, 1937 |
| 2,284,795 | Belaef | June 2, 1942 |
| 2,340,350 | Svoboda | Feb. 1, 1944 |

FOREIGN PATENTS

| Number | Country | Date |
| --- | --- | --- |
| 144,893 | Switzerland | May 16, 1931 |
| 408,803 | Great Britain | Apr. 19, 1934 |